(12) United States Patent
Bonner

(10) Patent No.: US 9,360,875 B2
(45) Date of Patent: Jun. 7, 2016

(54) VISCOSITY FEEDBACK TEMPERATURE CONTROL SYSTEM

(76) Inventor: Michael R. Bonner, Romeo, MI (US)

( * ) Notice: Subject to any disclaimer, the term of this patent is extended or adjusted under 35 U.S.C. 154(b) by 1308 days.

(21) Appl. No.: 12/945,427

(22) Filed: Nov. 12, 2010

(65) Prior Publication Data

US 2011/0108124 A1    May 12, 2011

Related U.S. Application Data

(60) Provisional application No. 61/260,703, filed on Nov. 12, 2009.

(51) Int. Cl.
*G05D 24/02* (2006.01)
*B05B 12/10* (2006.01)

(52) U.S. Cl.
CPC ............... *G05D 24/02* (2013.01); *B05B 12/10* (2013.01); *Y10T 137/0324* (2015.04)

(58) Field of Classification Search
CPC .................. G05D 24/02; B05B 12/10

USPC ............ 236/93 R, 1 C; 210/739, 774; 137/2; 73/54.02; 118/666, 667

See application file for complete search history.

(56) References Cited

U.S. PATENT DOCUMENTS

| 4,721,589 | A | * | 1/1988 | Harris | ............ 264/40.1 |
|---|---|---|---|---|---|
| 5,330,576 | A | * | 7/1994 | Clauditz | ............ 118/688 |
| 5,520,739 | A | * | 5/1996 | Frazzitta | ............ 118/667 |
| 5,755,882 | A | * | 5/1998 | Patrick | ............ 118/64 |
| 5,772,895 | A | * | 6/1998 | Sanchez et al. | ............ 210/739 |
| 5,779,799 | A | * | 7/1998 | Davis | ............ 118/663 |
| 6,699,328 | B1 | * | 3/2004 | Scholzig et al. | ............ 118/641 |

FOREIGN PATENT DOCUMENTS

DE      102004048721 A1 *  4/2006

* cited by examiner

*Primary Examiner* — Jonathan Bradford
(74) *Attorney, Agent, or Firm* — Young Basile Hanlon & MacFarlane P.C.; Denise M. Glassmeyer

(57) ABSTRACT

A viscosity feedback temperature control system that controls the viscosity of a process fluid about a user-defined setpoint by varying the temperature of the fluid within a user-defined range to take advantage of the viscosity versus temperature characteristics inherent in all fluids.

16 Claims, 5 Drawing Sheets

VISCOSITY FEEDBACK TEMPERATURE CONTROL SYSTEM

BACKGROUND

The present invention is directed to viscosity control systems. More particularly, the present invention is directed to viscosity feedback temperature control systems suitable for use with fluid transit applications as well as with fluid applicators.

It has been long understood that fluids change viscosity as a function of temperature. Even water exhibits a viscosity change of nearly 2:1 between 50° F.-100° F. In industrial processes such as coating, sealing, lubricating, and gluing, just to name a few, changes in viscosity that result from changes in ambient temperature or process-induced temperature variations can have a significant impact on the performance of the fluid being dispensed. A paint that is too warm, for instance, will exhibit a low viscosity and can produce "runs and sags" in the finish. A glue or sealer that is too warm may "creep" out of the designated gluing or sealing area due to its lower viscosity. Conversely, paint that is too cold may not atomize properly, resulting in an unacceptable surface finish. Glue that is too cold may not flow into the desired area(s), providing insufficient adhesion. Similarly, a sealer that is too cold may not flow into the designated location(s) and may not provide the required level of protection as a result.

The need to provide for viscosity control is important in a variety of applications. Thus, there exists a continuing need to provide viscosity feedback temperature control systems for use of fluid transit devices.

SUMMARY

The viscosity feedback temperature control system defines a combination of hardware structure and software decision-making processes designed to control the viscosity of a process fluid about a user-defined setpoint by varying the temperature of the fluid within a user-defined range to take advantage of the viscosity versus temperature characteristics inherent in all fluids.

The present disclosure is directed to a method for controlling viscosity of at least one fluid in a fluid transfer apparatus that includes the steps of establishing a viscosity set point and an operational temperature range for a fluid to be transferred via a fluid transfer apparatus, measuring viscosity of the fluid material in the fluid transfer apparatus and comparing the measured viscosity to the viscosity set point and generating a solution based upon that comparison. The solution is one of: maintaining fluid temperature, increasing fluid temperature, and decreasing fluid temperature. A command is produced based upon the generated solution, the command triggers activity in at least one temperature control device positioned in thermal contact with the fluid transfer apparatus.

DETAILED DESCRIPTION

As broadly disclosed, the present description presents embodiments and applications pertaining to a method for controlling viscosity of at least one fluid transiting a fluid transfer apparatus as well as a viscosity feedback temperature control system configured to achieve the same.

The viscosity feedback temperature control system disclosed herein provides a means for controlling the viscosity of a process fluid about a user-defined setpoint by varying the temperature of the fluid within a user-defined range to take advantage of the viscosity versus temperature characteristics inherent in the process fluid. The method and system as disclosed herein can be used with various fluid transit and fluid application devices to transfer or deliver fluid material to desired locations within the desired viscosity parameters.

The viscosity feedback temperature control system disclosed herein addresses these concerns of viscosity variation by taking advantage of the viscosity versus temperature characteristics of the particular process fluid. The combination of hardware and software allows the user to enter a desired viscosity (the setpoint) as well as the acceptable temperature range (the lower temperature limit and upper temperature limit) over which the process fluid is known to be stable. The control system then holds the viscosity of the process fluid constant as defined by the viscosity set point by varying the temperature of said fluid within user programmed limits. This configuration enables the control system to compensate for changes in ambient temperature, common from day to night and season to season, and/or for energy added to the process fluid by friction within the process itself, or lost through material usage/make-up, etc.

Figure 4:
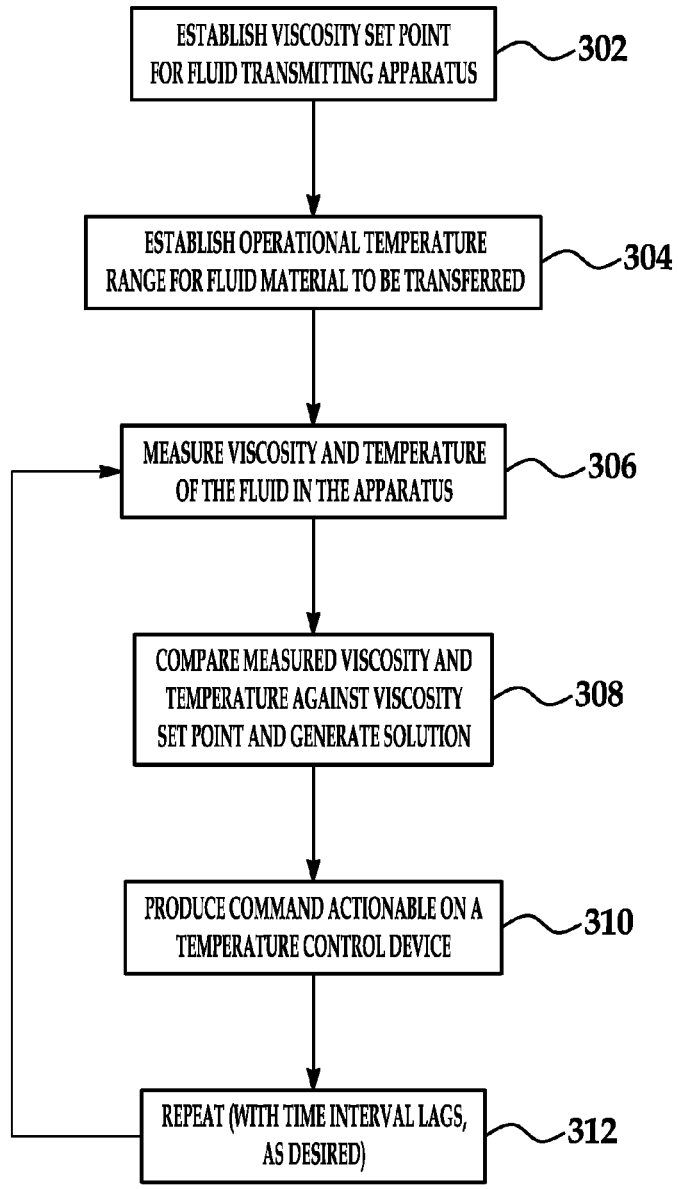
FIG. 4 is a general process flow diagram of the steps according to an embodiment of the method disclosed herein.

The method for controlling viscosity of at least one fluid in a fluid transfer apparatus is schematically presented in the process diagram in FIG. 4. The process or method includes the steps of establishing the viscosity set point for the fluid transiting the associated fluid transfer apparatus as at reference numeral 302. The viscosity set point can be derived from information known to the operator and/or available as part of material specifications and the like. It is contemplated that the viscosity set point can be one that is programmed or can be manually input by a user via a suitable user interface. It is also contemplated that the viscosity set point that is initially entered can derive from suitable industry or manufacturer standards or the like. The initial viscosity set point can be varied based upon a number of factors including, but not limited to, changes in the material to which the fluid is applied, changes in the composition of the fluid, changes in other extrinsic parameters etc. These extrinsic parameters can be quantified programically where possible, but can also be accounted for by user observation, consideration, and input. Thus it is contemplated that the a given fluid may have various viscosity set points associated with it depending upon factors such as the nature of the substrate to which it is applied, the applications purpose, etc. These various viscosity values may reside in the program, be established in look up tables or entered by the user.

The method also includes establishing an operational temperature range 304 for the fluid material to be transferred. The operational temperature range can be defined by the upper and/or lower functional limits of the fluid material to be transferred. These temperature limit ranges can be defined by one or more of material decomposition characteristics, separation or other physical or performance attributes, etc. The temperature limits may be known or derived from material manufacturer specifications, industry standards and the like. The temperature range limits can be inputted by any suitable means. The temperature range limits may be manually inputted for the specific operation, may be programically present in look up tables or the like or any combination of suitable input processes.

It is also within the scope of this disclosure that at least one of viscosity, set point values, viscosity set point variation parameters, temperature range limits or combinations of these values can be derived, in whole or in part, from data present in remote or diverse locations. Thus the steps of establishing viscosity set point and operational temperature set point can include processes and logic whereby databases remote to the fluid transiting apparatus are queried for relevant values and suitable data is utilized in the establishment step.

Figure 5:
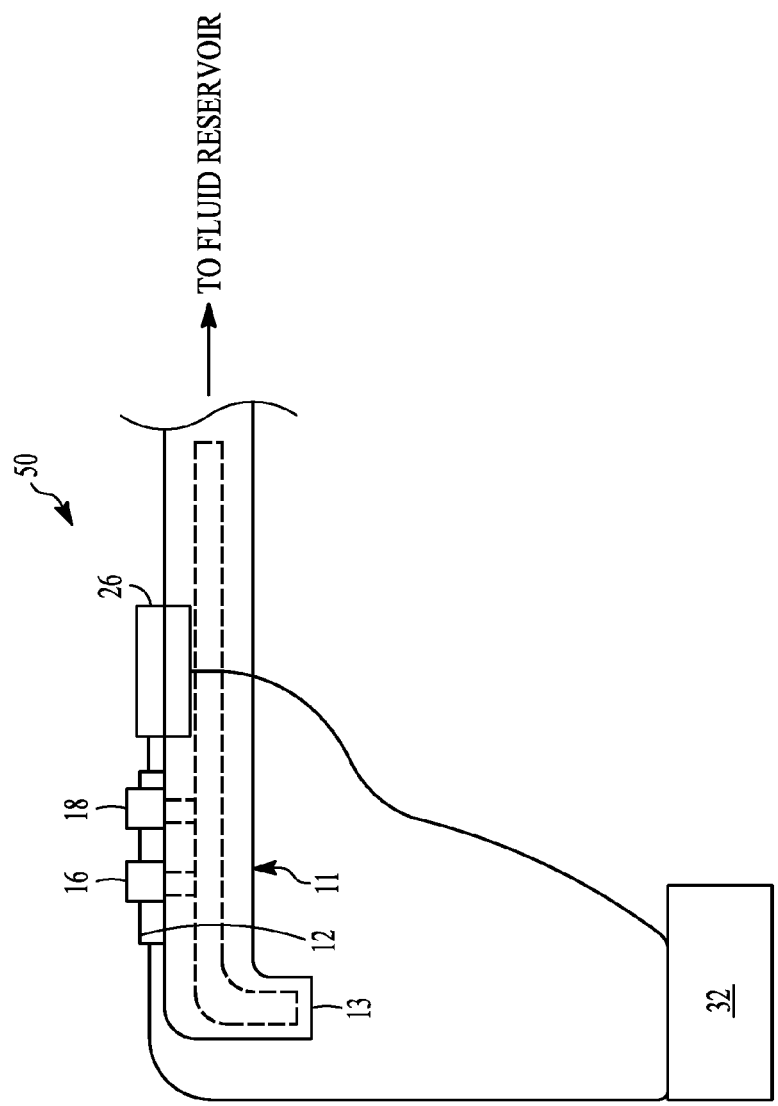
FIG. 5 is a schematic diagram an embodiment of a device for implementing the process disclosed herein.

The method disclosed herein calls for determination of viscosity and temperature of the fluid in the fluid transfer apparatus as at reference numeral 306. Fluid temperature and viscosity determination can be the result of direct or indirect measurement. In many embodiments, it is contemplated that the values will be obtained using suitable probes or sensors in contact with the fluid material to be transferred. Such probes or sensors can be located at desired positions in the transfer stream for example, in locations proximate to outlets in various applicator ports. The measurements can be conveyed to a central processing unit in any suitable manner where the data can be stored for further operations. Where desired or required, the measurements can be conducted multiple times and conveyed to that central processing unit and values derived from the statistical average of data. One such configuration is depicted schematically in FIG. 5 in which system 50 includes an applicator 11 having a port 13. Probes and sensors can be integrated into process module 12. These can include at least one viscosity measurement device such as viscometer 16 and at least one temperature measurement device such as temperature sensor 18. At lease one temperature adjustment device 26 is in electronic contact with process module 12 and is in thermal contact with the process stream flowing through applicator 1. The system 50 also includes at least one processing unit 32 that is configured to produce at least one command actionable on the temperature adjustment device.

The measured viscosity and temperature can be compared and evaluated against the input viscosity set point and generate a solution based upon that comparison as at reference numeral 308. The generated solution is one of: maintaining fluid temperature, increasing fluid temperature, and decreasing fluid temperature. The solution that is generated can be used to produce a command as at reference numeral 310 that operates on at least one temperature control mechanism associated with the fluid transfer apparatus and in thermal contact with the fluid located therein.

The temperature control mechanism can include a suitable heating or cooling unit or combination of the two that is associated with a suitable controller such as a PID or the like. The command that is generated can operate to generate incremental heating or cooling, to maintain the fluid temperature within operational parameters. It can also be one that triggers suitable out-of-limit alarms and/or reset cycles such that the method can be implemented on an iterative or repeating basis with suitable iterative delays or lags as desired or required as at 312.

Figure 1:
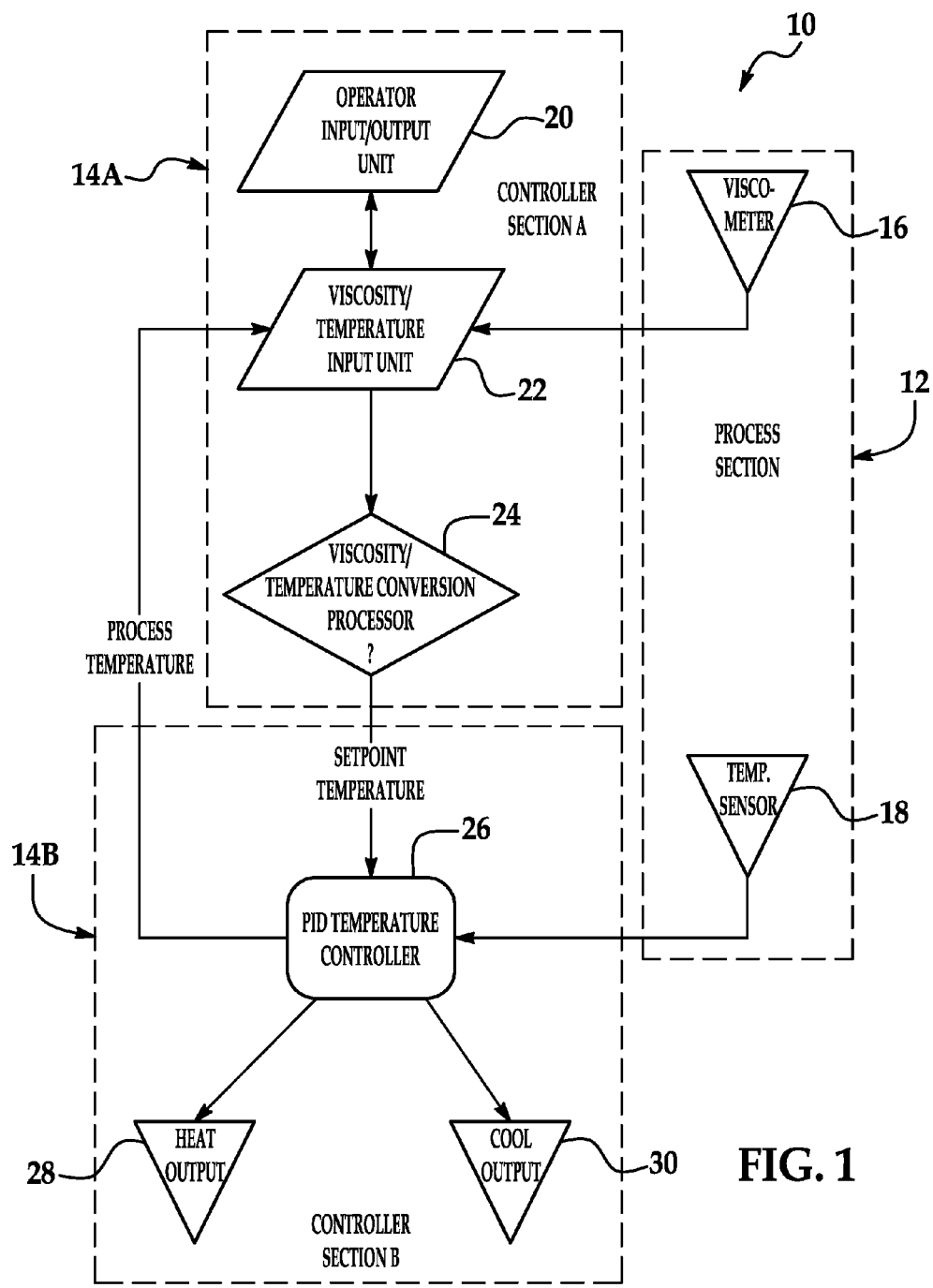
FIG. 1 is a functional diagram of an embodiment of the hardware configuration of the viscosity feedback temperature control system as disclosed herein.

The fluid material to be transferred can continue to move through the associated device while the viscosity regulation and adjustment process proceeds. The fluid transfer apparatus utilizing the viscosity control method disclosed herein can be any suitable device configured to convey fluid to a suitable dispensing or application point. In various embodiments, the method will utilize a viscosity control device associated with the fluid transfer apparatus. The device as disclosed herein can include a process module and a controller module. One embodiment of such a device 10 is depicted in FIG. 1 in which the controller module 14 can be divided into two functional sections designated 14A and 14B. Thus the device 10 as depicted in FIG. 1 can be composed of three (3) sections.

FIG. 1 depicts a schematic view of an embodiment of the hardware configuration of the viscosity feedback temperature control system disclosed herein. As depicted herein, the device 10 is divided into three (3) sections. The first of these to be addressed is the process module section 12. The process module 12 includes the sensor array of the device and is comprised of at least one viscometer 16 and at least one temperature sensor 18. The viscometer 16 can be any inline or side-stream system capable of determining the viscosity of a subject process fluid. In certain embodiments, the viscometer 16 will be one that is configured to be capable of continuous, real-time measurement; but a short, repetitive measurement cycle is also acceptable. There are many such measurement systems available in the marketplace.

The temperature sensor 18 can be configured to measure output material temperature and relay such information to controller module 14 B. The temperature sensor 18 can be a suitable thermistor, thermocouple (Y, J. T, etc.), RTD (100 pT, nickel, 3-wire, 4-wire, etc.) configured to be compatible not only with the input to the controller device 10 but also with the process being measured. The temperature sensor 18 will be selected based on accuracy, response time, longevity, and other process-specific criteria. It is contemplated that the process module 12 can be positioned at a suitable location on an associated fluid transfer apparatus to provide process-relevant data regarding viscosity and temperature conditions. It is also within the purview of the disclosure that the device include multiple process modules 12 as desired or required according to the function to the associated fluid transfer apparatus. The other modules 14A and 14B can be located proximate to the process module 12 or can be located a remote distance from the process module. The respective modules 12, 14A and 14B will include suitable means for communicating information therebetween, including but not limited to data transfer wires, wireless data transmitters and receivers and the like.

The device 10 also includes a suitable control system 14 configured to receive input from process section 12 and translate such input into commands operable on at least one fluid temperature control device and/or alarm mechanism. In the embodiment depicted in FIG. 1, the control system 14 is divided into two functional sections designated 14A and 14B. It is possible to configure the controller system 14 in two discrete devices in which one serves the functions set forth in controller section 14A and the other functions set forth in controller 14B. Likewise, it is possible that sections 14A and 14B may be combined into a single controller module which internally serves all of the functions listed under both sections.

Controller section 14A in the embodiment depicted includes an operator input/output unit 20. The operator input/output unit 20 can include a suitable user interface such as a display and input keypad (not shown). The operator input/output unit 20 can be configured to receive and translate input parameters to the device 10 and to transmit data regarding status of the device 10 and associated fluid transfer apparatus. The parameters can be manually inputted or can be derived from any suitable remote or proximate source including digital data and the like. Non-limiting examples of process parameters include target viscosity, temperature limits within which the fluid material traveling through the associated fluid transfer apparatus is known to be stable, as well as any other necessary control parameters including but not limited to flow speed, turbulence, etc.

The input parameters are fed to the viscosity/temperature input unit 22. The viscosity/temperature input unit 22 is configured to also receive signals from the at least one viscometer 16 positioned in or associated with the process stream of the associated fluid transfer apparatus, and also coordinate and retransmit the process temperature data derived from suitable sensors 18 and/or PID temperature controller measurements associated with the device. The viscosity/temperature input unit 22 is configured to be capable of translating the input from the units of measure in which the viscometer is operating to any desired unit of measure (cP, SSY, Ford #4 seconds, Zahn #2 seconds, etc.) selected by the operator to be displayed via the operator input/output unit 20. This assures compatibility across various processes and industry conventions.

The controller module 14 also includes a viscosity/temperature conversion processor 24. In the embodiment depicted, the viscosity/temperature conversion processor is located in controller module 14A. This unit is configured to determine the best temperature at which to set the process fluid based on various parameters that may include the measured viscosity, the measured temperature, and the upper and lower temperature limit thresholds for the associated material. This is referred to herein as the calculated set point temperature. The calculated setpoint temperature is transmitted from processor 24 to a suitable temperature controller 26 such as the PID temperature controller in controller module 14B. In the embodiment depicted in FIG. 1, this is a device integrated into a single controller module. It may be a discrete PID heat/cool temperature controller 26. The PID heat/cool temperature controller 26 can be configured with a heat output 28 and a cool output 30. It is also within the purview of the invention to configure the controller module 14 so that the heat/cool controller is integrated into a single unit.

Figure 2:
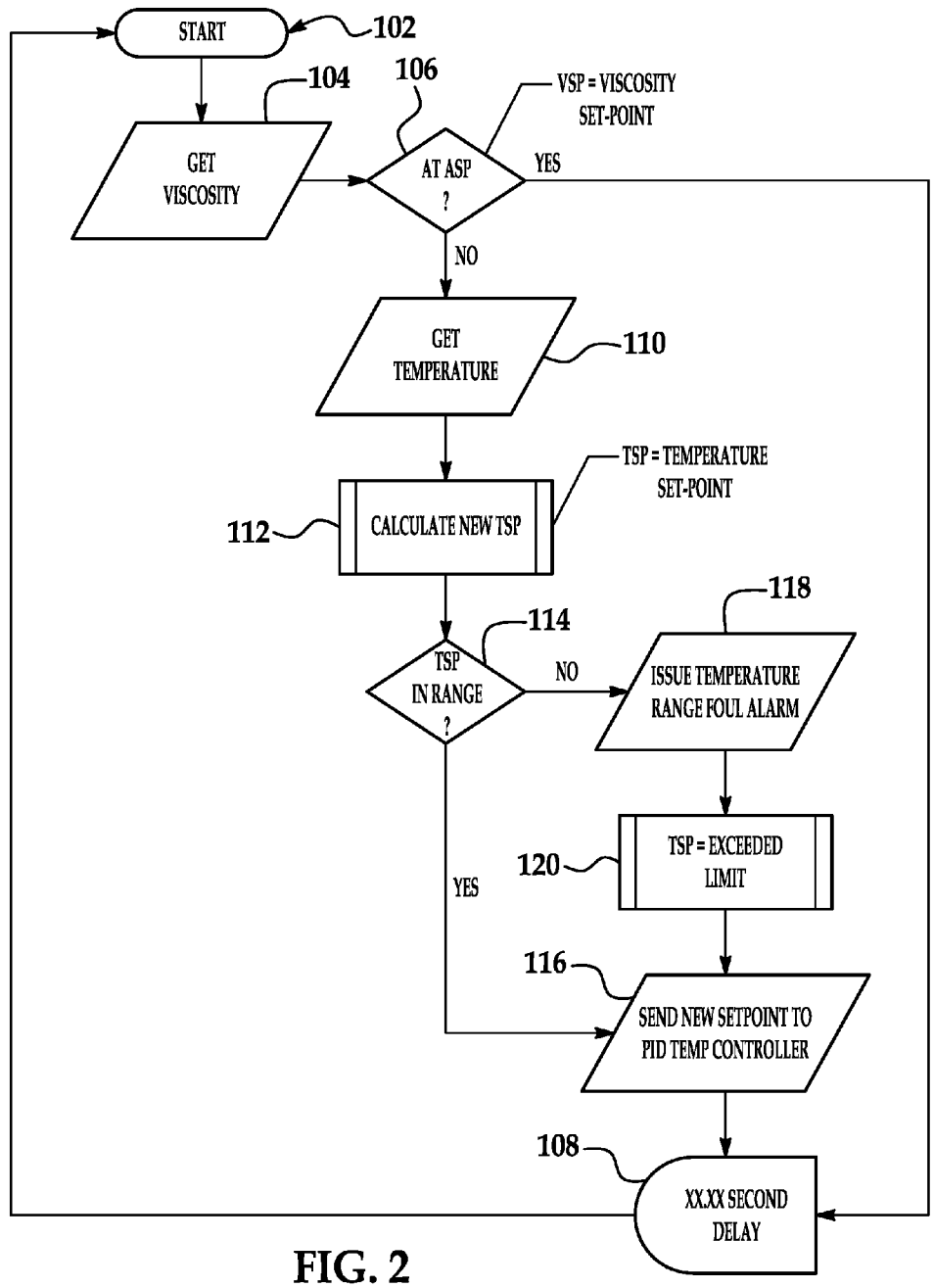
FIG. 2 is an overview of an embodiment of the viscosity/temperature conversion process within the viscosity feedback temperature control system as disclosed herein.

An embodiment of the operational process of the viscosity/temperature conversion processor 26 is shown in FIG. 2. The process can be initiated with a start command 102 by ascertaining the actual viscosity of the process fluid as at reference numeral 104. Here we see that the first step is to get a measurement of the actual process fluid viscosity. This is compared to the viscosity set point (VSP) that has been inputted or obtained by suitable method as at reference numeral 106. In the embodiment of FIG. 1, the viscosity set point can be input through the user input unit 20.

If the measured viscosity is within the allowable limits of the VSP, a predetermined delay is initiated as at reference numeral 108 and the monitoring process loop is initiated over again. The predetermined delay can be for any suitable interval. In certain embodiments, it is contemplated that the delay will be for an interval of 5 to 15 seconds.

If the measured viscosity is not within the allowable limits of the VSP, then a process temperature reading is acquired as at reference numeral 110. The measured process temperature and measured viscosity are calculated relative to the viscosity set point VSP parameters and a new temperature set point solution value is produced. Thus, based on the measured viscosity, the measured temperature and the VSP, a new temperature set point (TSP) is calculated as at reference numeral 112.

The new TSP is analyzed against temperature range parameter limits inputted through the user interface as at reference numeral 114. If the new TSP is within the permissible temperature range, the new temperature set point is passed to the PID temperature controller as at reference 116. If the new TSP is outside of the allowed temperature range and the TSP is set to the exceeded limit (upper or lower), a temperature range fault alarm is issued to the operator to alert him/her to the fact that the VSP cannot be attained within the allowed temperature limits as at reference 118 and the new calculated TSP that exceeds that limit as at reference 120 is passed to the PID temperature controller as at reference numeral 116. Once again, a predetermined delay is initiated and the process is started over again.

Figure 3:
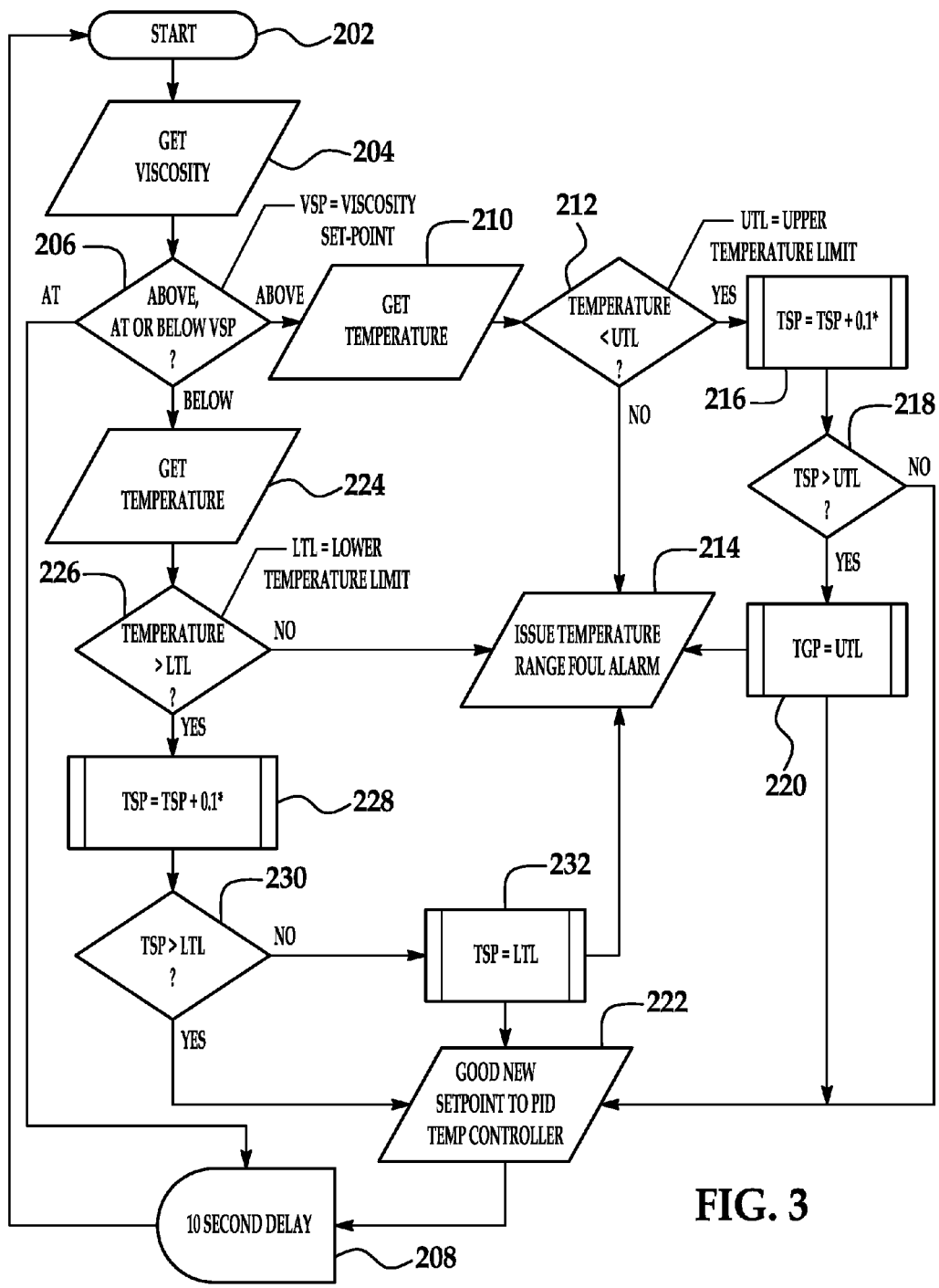
FIG. 3 is a decision tree within the program/circuitry of a typical viscosity feedback temperature control system as disclosed herein.

A typical implementation of the viscosity to temperature conversion process as outlined herein is shown in more detail in FIG. 3. Upon the initiation of the process as at reference 202, the first step is to obtain a measurement of the actual process fluid viscosity as at reference numeral 204. This value is compared to the viscosity set point (VSP) input by the operator or preset in any suitable manner as at reference numeral 206. If the measured viscosity is within the allowable limits of the VSP, a suitable delay is initiated as at reference numeral 208 and the process is started over again. In the embodiment depicted the delay is set at 10 seconds, producing a suitable process loop time such as a nominal 10-12 second loop time. This can be varied to provide a suitable process loop for the associated fluid transfer apparatus.

If the measured viscosity is above the allowable limits of the VSP, then a process temperature reading is acquired as at reference numeral 210. The measured process temperature is compared to the upper temperature limit (UTL) value that has been inputted as at reference 212. If the measured process temperature is above the UTL, the program is configured such that the temperature set point remains unchanged and a temperature range fault alarm is issued to the operator as at 214.

If the measured temperature value is below the UTL, then a new temperature (TSP) is calculated by incrementing the existing TSP by a suitable fractional temperature increment. In the embodiment depicted in FIG. 3, the fractional increment is 0.1° (either ° C. or ° F. as selected by the operator at system setup) as at reference 216. The new TSP is again compared to the UTL as at reference numeral 218. If the new TSP is less than or equal to the UTL, then the new TSP and is sent to the PID temperature controller with the associated PID command as at reference numeral 222 and the delay is initiated as at 208 and the process is started over again. The PID operates on any suitable heating devices to increase the temperature of the process fluid during the interval.

If the TSP is greater than the UTL, the new TSP is set equal to the UTL; a temperature range fault alarm is issued to the operator as at reference 214. The new TSP is sent to the PID temperature controller for suitable implementation, the predetermined delay is initiated and the process started over again.

Conversely, if the measured viscosity is below the allowable limits of the VSP, a process temperature reading is acquired as at reference numeral 224. This is compared to the lower temperature limit (LTL) as at reference numeral 226. If the temperature is below the LTL, then the TSP remains unchanged and a temperature range fault alarm is issued to the operator as at reference numeral 214. If the temperature is above the LTL, then a new TSP is calculated by decrementing the existing TSP by a suitable temperature decrement. In the embodiment as shown in FIG. 3, the decrement is in an interval of 0.1° (either ° C. or ° F. as selected by the operator at system setup) as at reference numeral 228. The new TSP is again compared to the LTL as at reference 230. If the new TSP is greater than or equal to the LTL, then the new TSP is sent to the PID temperature controller as at reference numeral 222 and the predetermined delay is initiated as at reference numeral 208, and the process is started over again.

If the TSP is lower than the LTL, the new TSP is set equal to the LTL, a temperature range fault alarm is issued to the operator as at reference numeral 214, and the new TSP is sent to the PID temperature controller and the predetermined delay is initiated as at reference numeral 208 and the process started over again.

The implementation of this logic allows the viscosity to be controlled by manipulated changes in temperature but maintained within a set of safe temperature limits for the process fluid being utilized.

The process and device as outlined herein can provide for inline point of use control in order to variably control the viscosity by manipulating temperature of the process material transitting various fluid transfer devices. It is contemplated that the process and device is disclosed herein can be employed with various fluid application devices including, but not limited to, fluid dispensing devices such as paint and coatings applications and adhesive applicators, particularly those where the application point or outlet is remote from any suitable fluid holding tank. Thus the process permits viscosity control without requiring the addition of solvent that could lead to formulation variables.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for controlling viscosity of at least one fluid in an in-line, closed loop fluid transfer apparatus having a point of use outlet for the fluid being transferred, the method comprising the steps of:
    establishing a viscosity set point for a fluid material being transferred in the in-line, closed loop fluid transfer apparatus, wherein at least one of viscosity set point value and viscosity set point variation parameters is derived from data bases remote to the fluid transfer apparatus;
    measuring viscosity of the fluid material in the fluid transfer apparatus at at least one point located in the in-line, closed loop fluid transfer apparatus, wherein the at least one point in the fluid transfer apparatus is located proximate and prior to the point of use outlet and wherein the fluid exiting the point of use outlet is applied to a support surface, wherein the point of use outlet is an applicator port and wherein viscosity of the fluid material in the fluid transfer apparatus is directly measured by at least one probe or sensor located proximate to the applicator port;
    establishing an operational temperature range for the fluid material being transferred in the in-line, closed loop fluid transfer apparatus, wherein the temperature range limits are derived from data bases remote to the in-line, closed loop fluid transfer apparatus, and wherein the operational temperature range includes an upper operational temperature limit and a lower operational temperature limit;
    measuring temperature of the fluid material in the in-line, closed loop fluid transfer apparatus at points in the in-line, closed loop fluid transfer apparatus, wherein at least one temperature measurement point is located proximate to and prior to the point of use outlet;
    comparing the viscosity measured at the applicator port to the established viscosity set point and generating a solution based upon the comparison, the generated solution including at least one of maintaining fluid temperature, increasing fluid temperature or decreasing fluid temperature of fluid in the in-line closed loop fluid transfer apparatus; and
    producing at least one command based upon the generated solution, the command operating and controlling function of at least one PID temperature control device positioned in thermal contact with the fluid in the in-line, closed loop fluid transfer apparatus;
    wherein the step of establishing viscosity set point and operational temperature range comprises varying at least one of operational temperature range or viscosity value based upon at least one extrinsic parameter; and
    allowing the fluid to be transferred through the applicator port to move through the in-line, closed loop fluid transfer apparatus prior to exiting the applicator port until viscosity regulation and adjustment occurs.

2. The method of claim 1 wherein the solution generating step includes correlating fluid temperature to viscosity-temperature data for the associated fluid.

3. The method of claim 2 wherein the solution generating step further comprises incrementally adjusting the measured fluid temperature within defined process set points.

4. The method of claim 1 wherein the step of establishing viscosity set point and operational temperature range further comprises the following:
    querying at least one data base for operational temperature range and viscosity set point values relevant to the fluid in the in-line closed loop fluid transfer apparatus;
    wherein the at least one extrinsic parameter includes at least one of fluid usage, application purpose, substrate material to which fluid is applied, ambient environmental conditions, fluid decomposition characteristics or physical performance attributes.

5. The method of claim 1 wherein measurement of fluid viscosity and/or fluid temperature comprises: direct measurement of fluid viscosity or fluid temperature using at least one probe or sensor, wherein said direct measurement step occurs at least once.

6. The method of claim 5 wherein direct measurement of fluid viscosity and/or fluid temperature comprises;
    direct measurement of fluid viscosity, said direct measurement step occurring a plurality of times at intervals and wherein the measurement value is a statistical average.

7. A process for controlling viscosity in a fluid dispensed from an in-line closed loop fluid conveying system having at least one applicator port in fluid contact with the in-line closed loop fluid conveying system, the applicator port defining an outlet in the in-line closed loop fluid conveying system, the process comprising the steps of:
    measuring viscosity of a process stream composed of fluid circulating in the in-line closed loop fluid conveying system against a defined viscosity parameter, the viscosity measurement occurring at a location in the in-line closed loop fluid conveying system proximate to the applicator port defining the outlet in the in-line closed loop system, and determining whether the measured viscosity is comparable to the defined viscosity parameter;

initiating an analysis interval delay if the measured viscosity is within the defined viscosity parameter or ascertaining actual fluid temperature if the measured viscosity falls outside the defined viscosity parameter;

measuring temperature of the process stream composed of fluid circulating in the fluid conveying system, wherein temperature measurement occurs at locations in the fluid transfer stream;

calculating a revised temperature set point if the measured viscosity of the process stream falls outside the defined viscosity parameter;

issuing a command actionable on at least one temperature adjustment device associated with the in-line closed loop fluid conveying system resulting in modification of the temperature of the fluid circulating in the in-line closed loop fluid conveying stream, wherein temperature modification has a temperature modification value and the temperature modification value is limited by an inputted upper operational temperature limit and an inputted lower operational temperature limit, wherein the inputted lower operational temperature limit and the inputted upper operation temperature limit are specific to the fluid circulating in the in-line closed loop fluid transfer system.

8. The process of claim 7 wherein the defined viscosity parameter is one of a user inputted parameter setpoint or a programmed setpoint.

9. The process of claim 8 further comprising the step of adjusting thermal input based upon actual ascertained fluid temperature.

10. The process of claim 9 wherein at least one of the inputted lower temperature limit, inputted upper temperature limit or combination thereof are user programmed based on fluid stability.

11. The method of claim 4 further comprising the step of iteratively repeating the steps outlined in claim 1.

12. A device for implementing the process of claim 7, the device having an in-line closed loop system having at least one applicator port, the applicator port having an outlet, the device comprising:

at least one viscosity measurement device operatively positioned in a fluid stream proximate to the outlet;

at least one temperature measurement device positioned in the fluid stream upstream of the viscosity measurement device;

at least one temperature adjustment device in thermal contact with the fluid stream;

at least one user interface configured to receive input, the input including at least one of the following: viscosity set point, process stream fluid maxima, or process stream fluid minima;

at least one processing unit configured to produce at least one command actionable on the temperature adjustment device, the command produced as a result of user interface input or viscosity measurement device input or temperature measurement input or external environment conditions.

13. The device of claim 12 wherein said viscosity measurement device is a viscometer and the viscometer is operatively connected to the processing unit via at least one viscosity/temperature input unit.

14. The device of claim 13 wherein the temperature adjustment device is operatively connected to the viscosity/temperature input unit and includes the at least one PID.

15. The device of claim 14 wherein the at least one processing unit is computationally interposed between the viscosity/temperature input unit and the temperature adjustment device.

16. The process of claim 7 wherein the revised temperature calculation step comprises:

establishing a viscosity set point and an operational temperature range for the fluid material, wherein at least one of viscosity set point value, viscosity set point variation parameters and temperature range limits are derived at least in part from data based remote to the fluid transfer apparatus.

* * * * *